United States Patent
Voss, III

(10) Patent No.: US 7,735,672 B2
(45) Date of Patent: Jun. 15, 2010

(54) VENTED NON-SPILL FUEL CAP ASSEMBLY WITH FILL INDICATOR

(76) Inventor: Frederick Voss, III, P.O. Box 6455, Fernandina Beach, FL (US) 32035

( * ) Notice: Subject to any disclaimer, the term of this patent is extended or adjusted under 35 U.S.C. 154(b) by 648 days.

(21) Appl. No.: 11/675,624

(22) Filed: Feb. 15, 2007

(65) Prior Publication Data
US 2008/0023476 A1    Jan. 31, 2008

Related U.S. Application Data

(60) Provisional application No. 60/834,355, filed on Jul. 31, 2006.

(51) Int. Cl.
B65D 51/16    (2006.01)

(52) U.S. Cl. .................. 220/202; 220/203.25

(58) Field of Classification Search ............... 73/290 R; 220/202
See application file for complete search history.

(56) References Cited

U.S. PATENT DOCUMENTS

| | | | | |
|---|---|---|---|---|
| 3,253,430 A * | 5/1966 | Piffath | | 431/277 |
| 4,491,247 A * | 1/1985 | Nitchman et al. | | 222/131 |
| 4,676,390 A * | 6/1987 | Harris | | 220/203.06 |
| 4,779,755 A * | 10/1988 | Harris | | 220/203.21 |
| 4,795,050 A * | 1/1989 | Smith et al. | | 220/746 |
| 4,886,089 A * | 12/1989 | Gabrlik et al. | | 137/202 |
| 5,183,173 A * | 2/1993 | Heckman | | 220/203.07 |
| 5,240,027 A * | 8/1993 | Vertanen | | 137/73 |
| 5,720,328 A * | 2/1998 | Ott | | 141/312 |
| 5,732,840 A * | 3/1998 | Foltz | | 220/86.2 |
| 6,000,413 A * | 12/1999 | Chen | | 134/102.2 |
| 6,056,140 A * | 5/2000 | Muth et al. | | 220/203.25 |
| 6,302,170 B1 * | 10/2001 | Ott | | 141/312 |
| 6,641,391 B1 * | 11/2003 | Xu | | 431/255 |
| 6,789,586 B2 * | 9/2004 | Levey | | 141/350 |
| 7,168,297 B2 * | 1/2007 | Herzog et al. | | 73/49.2 |
| 7,462,033 B2 * | 12/2008 | Xie | | 431/142 |

* cited by examiner

*Primary Examiner*—Daniel S Larkin
*Assistant Examiner*—Rodney T Frank
(74) *Attorney, Agent, or Firm*—Rogers Towers, P.A.; Richard S. Vermut; Stephen E. Kelly

(57) ABSTRACT

A vented non-spill fuel cap assembly includes a self-sealing, releasable fluid coupling and a visible fill indicator. The fuel cap assembly permits transfer of fuel from a storage vessel such as a gas canister to a fuel tank equipped with the cap assembly in a manner which prevents escape and spillage of liquid fuel and vapors. Fuel is introduced from a supply canister or other source via a hose and coupling releasably matable with the self-sealing coupling on the cap assembly, without removal of the cap assembly. The indicator visibly indicates when the tank is full.

11 Claims, 5 Drawing Sheets

US 7,735,672 B2

VENTED NON-SPILL FUEL CAP ASSEMBLY WITH FILL INDICATOR

FIELD OF THE INVENTION

This invention relates to fuel caps, and, more particularly, to a vented non-spill fuel cap assembly with a releasable coupling for filling and a fill indicator.

BACKGROUND

A common problem with filling fuel tanks is that fuel can easily spill out, especially where fuel is being poured from a portable tank through a nozzle into a the fuel tank of motorized equipment. As fuel flows into the tank, the splashing of the fuel within the tank can overspill outside the tank. The resultant exterior spillage can be dangerous due to the combustible volatility of the fuel. Additionally, fuel spills can damage surrounding equipment paint and stain clothing. Furthermore, noxious and dangerous fumes escape during filling. Additionally, when tanks are being filled it is normal for the cap to be totally removed from the tank, which can result in the user either or both forgetting to replace the cap cover or losing the cap cover. Clearly, operating equipment without a fuel cap is unsafe and dangerous to the operator and others in the vicinity. Removal of the cap also allows opportunity for harmful debris to enter the fuel tank, which can create serious maintenance issues and shorten the life of the engine fueled through the tank.

What is needed is a fuel cap that facilitates transfer of fuel from a first storage vessel (e.g., fuel can) to a second fluid receiving vessel (e.g., fuel tank on equipment) in a manner which prevents escape and spillage of fuel in liquid and gaseous form. The invention is directed to overcoming one or more of the problems and solving one or more of the needs as set forth above.

SUMMARY OF THE INVENTION

To solve one or more of the problems set forth above, in an exemplary implementation of the invention, a vented non-spill fuel cap assembly with a releasable coupling for filling and a fill indicator is provided to facilitate transfer of fuel from a first storage vessel (e.g., fuel can) to a second fluid receiving vessel (e.g., fuel tank on equipment) in a manner which prevents escape and spillage of fuel in liquid and gaseous form.

In one aspect of an exemplary embodiment of the invention, a fuel cap assembly for a fuel tank with a filler neck is provided. The cap includes a lid coupled to a collar. The collar is adapted to engage the filler neck of the fuel tank. The lid includes an exterior and interior side. A first fluid coupling is provided on the exterior side of the lid. A port is provided on the interior side of the lid in fluid communication with the first coupling. The first coupling includes a releasable valve biased into a closed position when the first coupling is not engaged by a compatible mating coupling. The first fluid coupling may be a quick disconnect coupling member such as a male quick disconnect coupling member.

In another aspect of an exemplary embodiment of the invention, an indicator assembly is attached to the lid and adapted to indicate when a full fuel level is attained. The indicator assembly may include an indicator port through the lid, a transparent exterior housing attached to the exterior side of the lid over the indicator port, a movable indicator slidingly disposed in the port and a buoyant float attached to the movable indicator on the interior side of the lid. The movable indicator includes a head configured to move within the transparent exterior housing from a recessed position to a raised position under the influence of buoyancy.

In another aspect of an exemplary embodiment of the invention, a protective cover is provided to releasably engage the first fluid coupling when not in use. The protective cover may be tethered to the cap assembly by a strap.

In another aspect of an exemplary embodiment of the invention, a vent is also provided. The vent allows gaseous communication between the atmosphere and fuel tank.

In another aspect of an exemplary embodiment of the invention, a fuel refilling system includes the fuel cap assembly as described above and a fuel supply with a fuel supply line terminating with the compatible mating coupling. The first fluid coupling may be a quick disconnect coupling member and the compatible mating coupling may be a quick disconnect coupling member configured to releasably engage the first fluid coupling.

In another aspect of an exemplary embodiment of the invention, a method of filling a fuel tank using a fuel refilling system as described above includes steps of providing a fuel supply source with a supply line terminating with the compatible mating coupling; connecting the compatible mating coupling to the first coupling to establish fluid communication; supplying fuel through the supply line, through the compatible mating coupling, through the first coupling, and into the fuel tank until the tank is full; and disengaging the compatible mating coupling from the first coupling. Afterwards, a protective cover may be installed over the first coupling.

BRIEF DESCRIPTION OF THE DRAWINGS

The foregoing and other aspects, objects, features and advantages of the invention will become better understood with reference to the following description, appended claims, and accompanying drawings, where:

Figure 1:
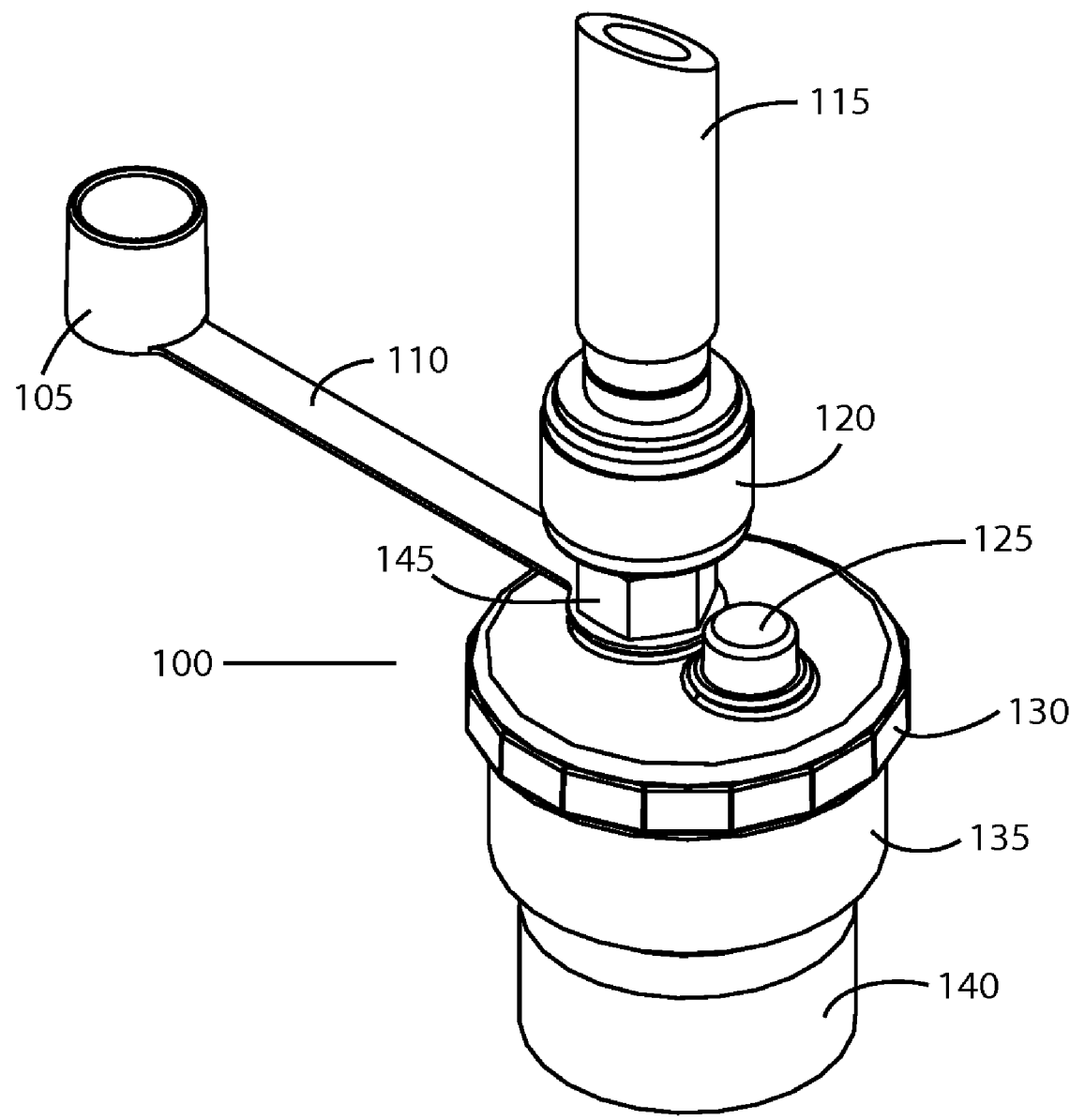
FIG. 1 shows a top perspective view of a vented non-spill fuel cap assembly with a releasable coupling for filling and a fill indicator according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes, ornamental aspects or proportions shown in the figures.

DETAILED DESCRIPTION

Referring to the Figures, in which like parts are indicated with the same reference numerals, various views of an exemplary fuel cap assembly, and components thereof, are shown. A fuel cap assembly according to principles of the invention permits transfer of fuel from a first storage vessel such as a gas canister to a second fluid receiving vessel such as a fuel tank of a vehicle or motorized equipment in a sealed manner which prevents escape and spillage of liquid fuel and vapors and introduction of debris. The exemplary fuel cap assembly features a self-sealing, releasable fluid coupling, a vent and a visible fill indicator. Fuel is introduced from a supply canister or other source via a hose and coupling releasably matable with the self-sealing coupling on the cap assembly, without removal of the cap assembly.

Referring to FIG. 1, an exemplary fuel cap assembly 100 according to principles of the invention includes a cap lid portion 130 coupled to a collar 135. The collar 135 is adapted to engage the fuel filler neck 140 of a fuel tank to be filled (not shown). In the lid 130 are through-holes to accommodate an indicator assembly 125 and coupling assembly 145. Fuel is introduced from a supply canister or other source (not shown) via a hose 115 and compatible supply coupling 120. The supply coupling 120 releasably mates with the coupling assembly 145 on the cap assembly 100.

A protective cover 105 is tethered to the cap assembly 100 by a strap 110. The protective cover 105 may be placed over and engage the coupling assembly 145 when the supply coupling 120 is removed. Thus, the cover prevents debris and moisture from entering the coupling assembly.

Figure 2:
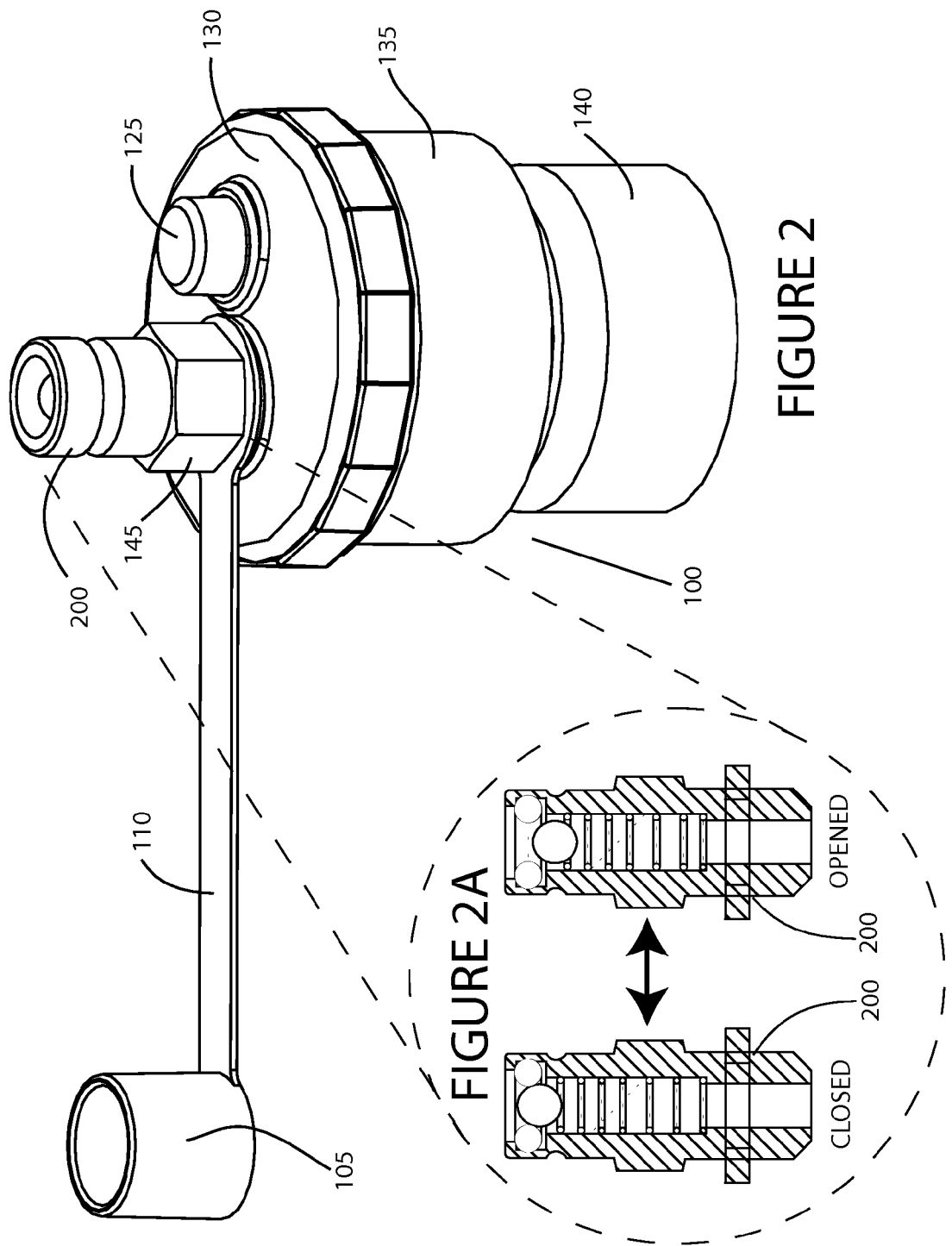
FIG. 2 shows a top perspective view of a vented non-spill fuel cap assembly with a releasable coupling for filling and a fill indicator according to principles of the invention.

Referring to FIG. 2, the exemplary fuel cap assembly 100 according to principles of the invention is shown with the supply coupling 120 removed. The exemplary coupling assembly 145 includes a male quick disconnect inlet 200 configured to releasably mate with the female supply coupling 120, as shown in FIG. 1. A self-sealing, quick-disconnect coupling is preferred to facilitate frequent coupling and uncoupling for refilling. The mating quick disconnect coupling members provide means for quickly disconnecting a line without leakage and without introducing foreign matter into the system. The female 120 and male 200 parts of the quick disconnect coupling each contain a valve which is held open when the coupling is connected, allowing fluid to flow in either direction through the coupling. When the coupling is disconnected, a spring in each part closes the valve, preventing the loss of fluid and entrance of foreign matter.

While quick disconnect couplings are preferred, the invention is not limited to such couplings. Instead, any releasable coupling that provides means for quickly and repeatedly connecting and disconnecting a fuel supply line without leakage and without introducing foreign matter into the system may be utilized and comes within the scope of the invention. In the preferred embodiment, the quick disconnect coupling members are capable of sealingly closing the respective apertures with which they are associated when the members are uncoupled from one another.

Figure 3:
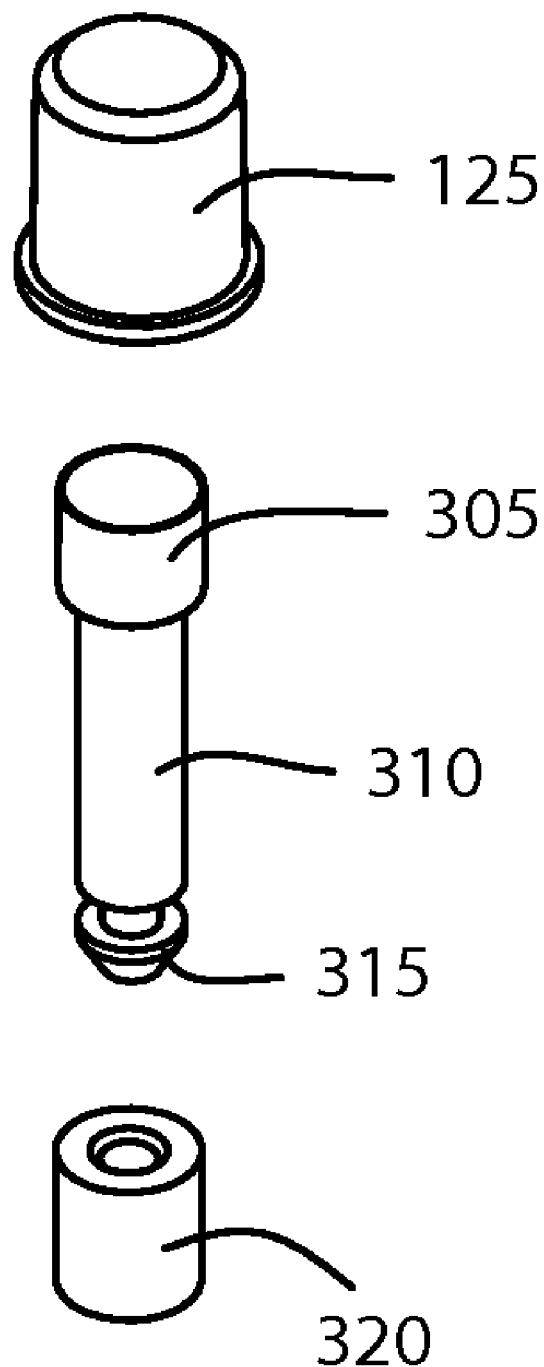
FIG. 3 shows a perspective view of a fill indicator assembly according to principles of the invention.

Referring now to FIG. 3, components of an exemplary indicator assembly are shown. The indicator assembly includes a transparent exterior housing 125, a movable indicator 310 and a buoyant float 320. The float includes a female socket configured to receive the male plug 315 of the movable indicator. The head 305 of the movable indicator is noticeably colored (e.g., red). The head 305 of the movable indicator is configured to move within the housing 125 from a recessed position to a raised position. When the collar 135 and filler neck 140 of the fuel tank are full, the buoyant float 320 forces the moveable indicator 310 upwardly to a full indication position. As the fuel level in the filler neck 140 drops, the movable indicator recedes downwardly until it reaches a bottom position. The range of travel of the movable indicator is defined by the distance between the bottom of the indicator head 305 and the top of the float 320, and may be limited by the height of the transparent housing 125. Thus, the indicator assembly reveals when a tank is full. Advantageously, because the indicator assembly is part of the exemplary cap assembly, no modification to the fuel tank is needed to provide the added level indicating function.

While a linear float-style indicator as described above is preferred, the invention is not limited to such an indicator. Instead, any indicator that can be integrated with the cap assembly and provides means for quickly and repeatedly revealing when the tank is full may be utilized and comes within the scope of the invention.

Figure 4:
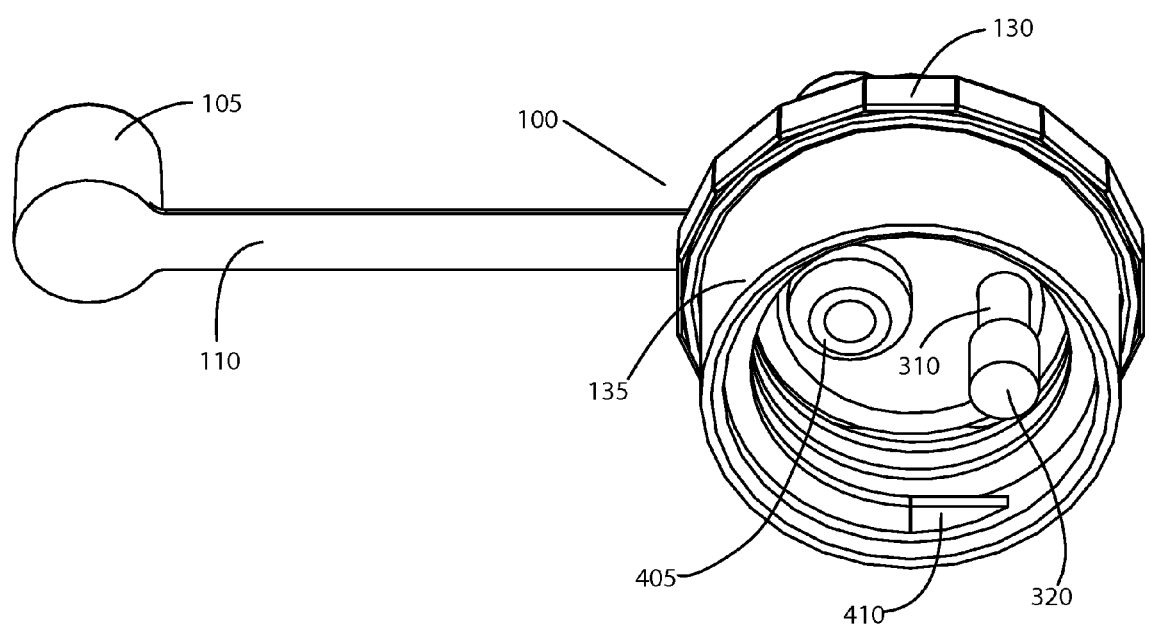
FIG. 4 shows a bottom perspective view of a vented non-spill fuel cap assembly with a releasable coupling for filling and a fill indicator according to principles of the invention.

Referring now to FIG. 4, a bottom perspective view of the exemplary vented non-spill fuel cap assembly with a releasable coupling for filling and a fill indicator according to principles of the invention is shown. The exemplary collar 135 includes internal threads 410 adapted to engage the filler neck 140 of a fuel tank to be filled. However, the invention is not limited to such threaded attachment or even releasable attachment. Instead, any means for engaging the filler neck 140 of a fuel tank may be utilized and is intended to come within the scope of the invention. By way of example and not limitation, the collar 135 may be an integral part of the fuel tank assembly, permanently attached to a fuel tank filler neck or releasably attached to a fuel tank filler neck.

As shown in FIG. 4, an inlet port 405 fluidly connected to the coupling assembly 145 provides a conduit for introduction of fuel into a fuel tank using the cap assembly 100. The configuration, shape and size of the port 405 are not particularly important so long as it enables entry of fuel in an efficient manner.

Also, as shown in FIG. 4, the buoyant float 320 and movable indicator extend downwardly into the space defined by the collar 135. Thus, as fuel fills the tank up to the level of the collar 135, buoyant forces drive the moveable indicator 310 upwardly to a full indication position. As the fuel level drops, the movable indicator 310 recedes downwardly until it reaches a bottom position.

Figure 5:
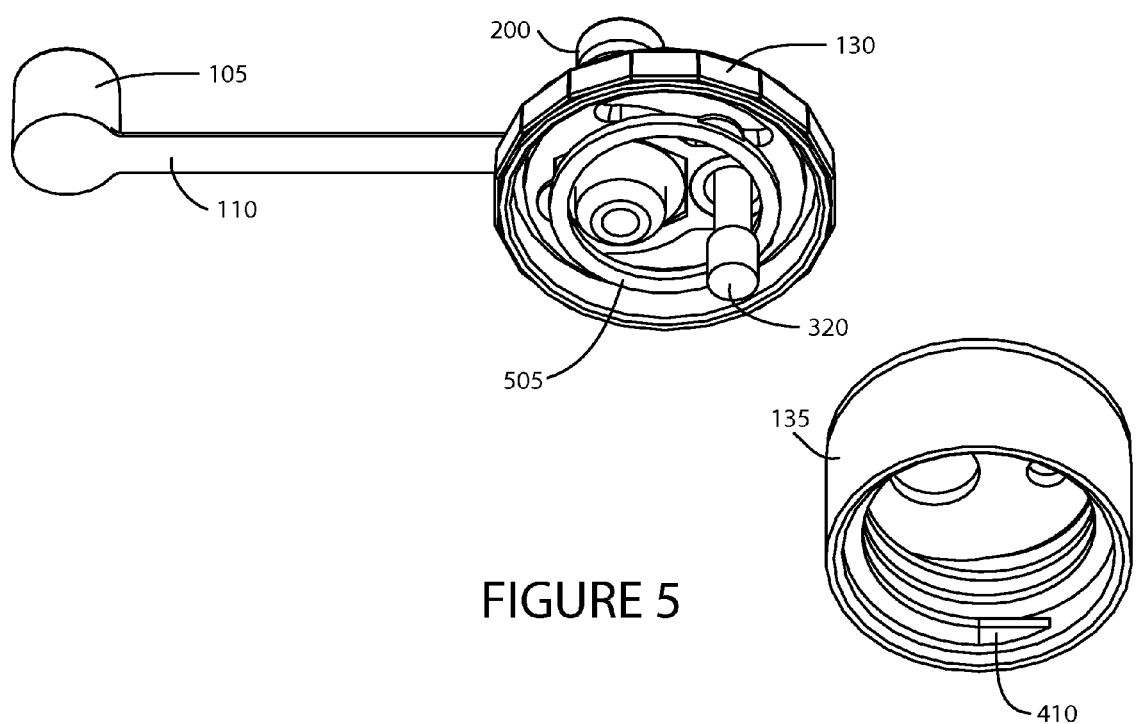
FIG. 5 shows a bottom exploded perspective view of a vented non-spill fuel cap assembly with a releasable coupling for filling and a fill indicator according to principles of the invention.

Referring now to FIG. 5, an exploded bottom perspective view of the exemplary vented non-spill fuel cap assembly with a releasable coupling for filling and a fill indicator according to principles of the invention is shown. The exemplary collar 135 is removed to reveal a venting disc 505. When air is needed for fuel flow, a vacuum contained in the fuel tank pulls air around the unsealed perimeter of the vent disc 505 through the at least one air passage. When the vacuum ceases, the vent diaphragm returns to its original sealing position, which does not allow fuel vapors into the atmosphere. While, such a venting assembly is preferred, the invention is not limited to cap assembly with any vent or the above described vent. Instead, any venting assembly suitable for integration with a fuel cap assembly may be utilized and is intended to come within the scope of the invention.

In use, the cap assembly 100 is attached to a filler neck 140 of a tank to be filled. To add fuel, the protective cover 105 is removed from the cap assembly coupling 200. Then a supply line 115 terminating with a compatible coupling 120 is connected to the cap assembly coupling 200. Upon such connection, valves in the couplings are opened and the line 115 is in fluid communication with the fuel tank. Fuel may then flow from the supply (e.g., a canister) through the line 115, through the supply coupling 120, through the inlet port 405 and into the fuel tank. When the filler neck 140 and collar 135 become filled with fuel, buoyant forces drive the float 320 and moveable indicator 310 upwardly to a full indication position. After the appropriate amount of fuel is dispensed, the couplings can be disengaged. Upon such disengagement, valves in the couplings return to a sealed closed position. Then the protective cover may be reinstalled over the cap assembly coupling 200. The refueling operation is then complete and may be repeated as needed.

The invention is not limited to any particular supply canister or other source, any particular type of supply line or any particular fluid transfer means. Fuel is introduced from a supply canister or other source (not shown) via a hose, i.e., the fuel supply line 115, through the supply coupling 120, through the inlet port 405 and into the fuel tank. Fuel may be supplied by gravity/pouring, manual pumping, motorized pumping, siphoning or any other fluid transfer means now known or hereafter developed.

In sum, the fuel cap assembly of the present invention provides a closed loop system enabling fuel to be transferred from a supply to a fuel tank in a safe manner, which permits little or no fuel or vapors to spill or escape, prevents debris from contaminating the fuel, and indicates when the tank is full.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A fuel cap assembly for a fuel tank with a filler neck, said cap comprising a lid coupled to a collar, said collar being adapted to engage the filler neck of the fuel tank, said lid including an exterior and interior side, a first fluid coupling on the exterior side of the lid, a port on the interior side of the lid in fluid communication with the first coupling, said first coupling including a releasable valve biased into a closed position when the first coupling is not engaged by a compatible mating coupling, and said releasable valve biased into an open position when the first coupling is engaged by the compatible mating coupling, and allowing fuel to flow through the compatible mating coupling and through the first fluid coupling and through the port and into the fuel tank without spillage when the first coupling is engaged by the compatible mating coupling;

said fuel cap assembly further comprising an indicator assembly, said indicator assembly being attached to the lid and adapted to indicate when a full fuel level is attained.

2. The fuel cap assembly of claim 1, said indicator assembly being attached to the lid and adapted to indicate when a full fuel level is attained, said indicator assembly comprising an indicator port through the lid, a transparent exterior housing attached to the exterior side of the lid over the indicator port, a movable indicator slidingly disposed in the port and a buoyant float attached to the movable indicator on the interior side of the lid, said movable indicator including a head configured to move within the transparent exterior housing from a recessed position to a raised position under the influence of buoyancy.

3. A fuel cap assembly for a fuel tank with a filler neck, said cap comprising a lid coupled to a collar, said collar being adapted to engage the filler neck of the fuel tank, said lid including an exterior and interior side, a first fluid coupling on the exterior side of the lid, a port on the interior side of the lid in fluid communication with the first coupling, said first coupling including a releasable valve biased into a closed position when the first coupling is not engaged by a compatible mating coupling, and said releasable valve biased into an open position when the first coupling is engaged by the compatible mating coupling, and allowing fuel to flow through the compatible mating coupling and through the first fluid coupling and through the port and into the fuel tank without spillage when the first coupling is engaged by the compatible mating coupling;

said fuel cap assembly further comprising a protective cover configured to releasably engage the first fluid coupling when not in use.

4. The fuel cap assembly of claim 3, further comprising said protective covering being tethered to the cap assembly by a strap.

5. A fuel cap assembly for a fuel tank with a filler neck, said cap comprising a lid coupled to a collar, said collar being adapted to engage the filler neck of the fuel tank, said lid including an exterior and interior side, a first fluid coupling on the exterior side of the lid, a port on the interior side of the lid in fluid communication with the first coupling, said first coupling including a releasable valve biased into a closed position when the first coupling is not engaged by a compatible mating coupling, and said releasable valve biased into an open position when the first coupling is engaged by the compatible mating coupling, and allowing fuel to flow through the compatible mating coupling and through the first fluid coupling and through the port and into the fuel tank without spillage when the first coupling is engaged by the compatible mating coupling;

further comprising a vent configured to allow gaseous communication between the atmosphere and fuel tank.

6. The fuel cap assembly of claim 5, said vent comprising a venting disc with an unsealed perimeter in communication with at least one air passage.

7. A fuel refilling system for a fuel tank with a filler neck, said system comprising:

a fuel cap assembly including a lid coupled to a collar, said collar being adapted to engage the filler neck of the fuel tank, said lid including an exterior and interior side, a first fluid coupling on the exterior side of the lid, a port on the interior side of the lid in fluid communication with the first coupling, said first coupling including a releasable valve biased into a closed position when the first coupling is not engaged by a compatible mating coupling; and a fuel supply line terminating with the compatible mating coupling;

wherein the first fluid coupling is a quick disconnect coupling member and the compatible mating coupling is a quick disconnect coupling member configured to releasably engage the first fluid coupling.

8. The fuel refilling system of claim 7, wherein the first fluid coupling is a male quick disconnect coupling member and the compatible mating coupling is a female quick disconnect coupling member configured to releasably engage the first fluid coupling.

9. The fuel refilling system of claim 7, further comprising an indicator assembly, said indicator assembly being attached to the lid and adapted to indicate when a full fuel level is attained.

10. The fuel refilling system of claim 7, further comprising an indicator assembly, said indicator assembly being attached to the lid and adapted to indicate when a full fuel level is attained, said indicator assembly comprising an indicator port through the lid, a transparent exterior housing attached to the exterior side of the lid over the indicator port, a movable indicator slidingly disposed in the port and a buoyant float attached to the movable indicator on the interior side of the lid, said movable indicator including a head configured to move within the transparent exterior housing from a recessed position to a raised position under the influence of buoyancy.

11. The fuel refilling system of claim 7, further comprising a protective cover configured to releasably engage the first fluid coupling when not in use, said protective covering being tethered to the cap assembly by a strap.

* * * * *